United States Patent
Blizzard et al.

(10) Patent No.: US 9,877,465 B2
(45) Date of Patent: Jan. 30, 2018

(54) CONVERTIBLE LEASH AND HARNESS SYSTEM AND METHOD

(71) Applicant: THUNDERSHIRT, LLC, Durham, NC (US)

(72) Inventors: Philip J. Blizzard, Durham, NC (US); Michael T. Schwartz, Durham, NC (US)

(73) Assignee: THUNDERSHIRT, LLC, Durham, NC (US)

(*) Notice: Subject to any disclaimer, the term of this patent is extended or adjusted under 35 U.S.C. 154(b) by 0 days.

(21) Appl. No.: 15/273,281

(22) Filed: Sep. 22, 2016

(65) Prior Publication Data

US 2017/0006835 A1     Jan. 12, 2017

Related U.S. Application Data

(62) Division of application No. 13/666,589, filed on Nov. 1, 2012, now Pat. No. 9,468,195.

(51) Int. Cl.
     *A01K 27/00*      (2006.01)

(52) U.S. Cl.
     CPC .......... *A01K 27/002* (2013.01); *A01K 27/003* (2013.01); *A01K 27/005* (2013.01)

(58) Field of Classification Search
     CPC .... A01L 27/002; A01L 27/003; A01L 27/005; Y10T 24/3424; Y10T 24/3492; Y10T 24/4755

See application file for complete search history.

(56) References Cited

U.S. PATENT DOCUMENTS

| | | | |
|---|---|---|---|
| 1,362,525 | A | 12/1920 | John |
| 1,474,231 | A | 11/1923 | Brown |
| 1,508,601 | A | 9/1924 | Huff |
| 1,541,701 | A | 6/1925 | Fox |
| 1,614,083 | A | 11/1927 | Plantico |

(Continued)

FOREIGN PATENT DOCUMENTS

| | | |
|---|---|---|
| AT | 1963 B | 8/1900 |
| CA | 2719829 A1 | 4/2012 |

(Continued)

OTHER PUBLICATIONS

"Sporn Simple Harness" www www.drsfostersmith.com, http://www.drsfostersmith.com/product/prod_display_cfm? (Accessed Jan. 2, 2013).

(Continued)

*Primary Examiner* — Thanh Pham
(74) *Attorney, Agent, or Firm* — Michael G. Johnston; Moore & Van Allen, PLLC

(57) ABSTRACT

A restraining apparatus for an animal including a combination of a leash and a harness to be used in conjunction with a collar. The restraining apparatus includes a ring defining an opening. A coupling element for fastening to a collar on the animal is mounted to the ring. A substantially rigid arm is mounted to the ring and extends to a free distal end spaced from the ring, with the arm forming a substantially elongated opening with the ring. A leash may be attached to the ring. When the restraining apparatus is applied to the animal as a harness, the coupling element is fastened to the collar, and the leash is wrapped around the torso of the animal, engages the arm at the elongated opening, and may freely slide and tighten around the torso of the animal.

3 Claims, 10 Drawing Sheets

(56) References Cited

U.S. PATENT DOCUMENTS

| | | |
|---|---|---|
| 1,685,435 A | 9/1928 | Philbrick |
| 1,800,421 A | 4/1931 | Wickersham |
| 1,906,043 A | 4/1933 | Bernstein |
| 2,023,950 A | 12/1935 | Hicks |
| 2,026,383 A | 12/1935 | Gyulay |
| 2,095,340 A | 10/1937 | Meyer |
| 2,187,021 A | 1/1940 | Everson |
| 2,233,397 A | 3/1941 | Bloom |
| 4,270,491 A | 6/1981 | Cox |
| 4,470,176 A | 9/1984 | Vermeulen et al. |
| 4,540,218 A | 9/1985 | Thomas |
| 4,941,434 A | 7/1990 | Ellwanger |
| 5,660,146 A | 8/1997 | Sporn |
| 5,791,295 A | 8/1998 | Schmid |
| 6,095,094 A | 8/2000 | Phillips |
| 6,247,427 B1 | 6/2001 | DeBien |
| 6,684,613 B2 | 2/2004 | Blocker |
| 7,111,588 B2 | 9/2006 | Blocker |
| 7,162,978 B2 | 1/2007 | DeBien |
| 7,174,859 B2 | 2/2007 | Lee |
| 7,299,527 B1 | 11/2007 | Gyure |
| 7,640,639 B2 | 1/2010 | De Bien |
| 7,810,220 B2 | 10/2010 | Anthony et al. |
| 7,954,211 B2 | 6/2011 | De Bien |
| 7,980,201 B2 | 7/2011 | Muelken |
| 2002/0046714 A1 | 4/2002 | Simmons |
| 2004/0025804 A1 | 2/2004 | Smith et al. |
| 2004/0154555 A1 | 8/2004 | Blocker |
| 2005/0115519 A1 | 6/2005 | Atkins et al. |
| 2005/0229869 A1 | 10/2005 | Leo |
| 2006/0236956 A1 | 10/2006 | Lord |
| 2006/0254534 A1 | 11/2006 | Lin |
| 2008/0134989 A1 | 6/2008 | Weiss |
| 2008/0134991 A1 | 6/2008 | DePass |
| 2008/0302311 A1 | 12/2008 | Blocker |
| 2009/0308330 A1 | 12/2009 | Kajanoff |
| 2009/0314224 A1 | 12/2009 | Rubinstein et al. |
| 2010/0050956 A1 | 3/2010 | Pellei |
| 2010/0294212 A1 | 11/2010 | Therrian |
| 2011/0083615 A1 | 4/2011 | Aaron et al. |
| 2011/0155077 A1 | 6/2011 | Hurwitz |
| 2011/0192355 A1 | 8/2011 | Van Duyl-Spaargaren |
| 2011/0203532 A1 | 8/2011 | Edlin et al. |
| 2011/0283956 A1 | 11/2011 | Silva |
| 2012/0260865 A1 | 10/2012 | Nesper |
| 2012/0304942 A1 | 12/2012 | Louro |

FOREIGN PATENT DOCUMENTS

| | | |
|---|---|---|
| DE | 459938 C | 5/1928 |
| DE | 490219 C | 1/1930 |
| DE | 29521911 U1 | 9/1998 |
| DE | 29521911 U1 | 10/1998 |
| DE | 202011108583 U1 | 8/2012 |
| FR | 626616 A | 9/1927 |
| GB | 190800933 A | 4/1908 |
| GB | 234655 A | 6/1925 |
| GB | 395108 A | 7/1933 |
| GB | 521358 A | 5/1940 |
| JP | H0619453 | 8/1992 |
| JP | 06019453 U | 3/1994 |
| JP | H08103184 | 6/1995 |
| JP | 08103184 A | 4/1996 |
| JP | 02003038212 A | 2/2003 |
| JP | 2005204622 A | 8/2005 |
| JP | 2011142852 A | 7/2011 |

OTHER PUBLICATIONS

European Patent Office, International Application No. PCT/US2013/067228 International Search Report and Written Opinion dated Apr. 24, 2014, pp. 1-12.
"Mimipets Dog/Cat Harness and Lead Set" www www.bestbuypet.com http://www.bestbuypet.com/wholesale/index.php? (Accessed Jan. 2, 2013).
"Size Right Harnesses" www.coastalpet.com, http://www.coastalpet.com/products/productsubitenns.php? (Accessed Jan. 2, 2013).
"Top 4 Dog Collar Styles" petsupplies.about.com, http://petsupplies.about.com/od/dogbasics/tpiTop-4-Dog-Collar-Styles.htm (Accessed 01102/2013).
USPTO; Advisory Action for U.S. Appl. No. 13/666,589, dated Jan. 7, 2014, 3 pages.
USPTO; Advisory Action for U.S. Appl. No. 13/666,589, dated Mar. 17, 2014, 5 pages.
USPTO; Advisory Action for U.S. Appl. No. 13/666,589, dated May 20, 2015, 3 pages.
USPTO; Final Office Action for U.S. Appl. No. 13/666,589, dated Jan. 14, 2015, 16 pages.
USPTO; Non-Final Office Action for U.S. Appl. No. 13/666,589, dated May 6, 2014, 16 pages.
USPTO; Non-Final Office Action for U.S. Appl. No. 13/666,589, dated Jun. 20, 2013, 11 pages.
USPTO; Non-Final Office Action for U.S. Appl. No. 13/666,589, dated Sep. 24, 2015, 14 pages.
USPTO; Final Office Action for U.S. Appl. No. 13/666,589, dated Oct. 10, 2013, 11 pages.
USPTO; Non-Final Office Action for U.S. Appl. No. 13/666,589, dated Apr. 23, 2013, 8 pages.
U.S. Appl. No. 13/666,589, filed Nov. 1, 2012.
THUNDERSHIRT, LLC, Australian Patent Application No. 2013338159, Patent Examination Report No. 1, Nov. 7, 2016.
Mar. 10, 2017, US Office Action; cited in U.S. Appl. No. 15/266,778.
May 8, 2017, Brazilian Office Action; cited in Brazilian Patent Application No. 302012003641-0.
Jul. 28, 2017, US Office Action; cited in U.S. Appl. No. 15/273,320.
Jun. 12, 2017, Japanese Office Action; cited in Japanese Patent Application No. 2015540724.
Jul. 26, 2017, European Office Action; cited in European Patent Application No. 13799411.7.
May 30, 2017, Canadian Office Action; cited in Canadian Patent Application No. 2889915.
USPTO; Final Office Action for U.S. Appl. No. 15/266,778 dated Dec. 12, 2017, 32 pages.

CONVERTIBLE LEASH AND HARNESS SYSTEM AND METHOD

CROSS-REFERENCE

This application is a divisional application of U.S. patent application Ser. No. 13/666,589, titled "CONVERTIBLE LEASH AND HARNESS SYSTEM AND METHOD", filed Nov. 1, 2012, now currently pending, the contents of which are incorporated herein by reference.

BACKGROUND

The system disclosed herein relates generally to the field of leashes, collars, and harnesses for animals, and may particularly relate to a system that may be used in conjunction with a collar that may be useful for controlling, restraining, or training a four-legged pet.

Pet owners and handlers generally prefer to be able to control their pets while engaging in an activity such as walking the pet or while in a location where movement of the pet needs to be restrained. For some pets, conventional collars may be inadequate to provide the degree of control that is desired. For example, a dog may pull on a leash attached to a conventional collar to the point where the owner cannot control the dog, resulting in the dog controlling the movement of the owner, or resulting in an unpleasant or even dangerous situation for the owner. Alternatively, the owner may merely be unable to maintain the dog in a desired position, as the dog may not be responsive to resistance of the leash. In addition, the pet, whether a dog, cat, or other animal, may have a tendency to "slip" a conventional collar.

Various options are available in addition to conventional collars for control of a pet, particularly dogs, including among them choke chains, prong collars, and Martingale collars. These devices, however, all apply force only to the neck of the pet. Conventional harnesses provide additional control of the torso of the pet, generally including loops that go around the front legs of the pet and that connect on the back of the pet, and cannot be slipped. Conventional harnesses, however, often require pulling a loop over the pet's head, connecting many fasteners that can be confusing, and using multiple adjustment points. Many pet owners do not like how time consuming and confusing such conventional harnesses can be. In addition, conventional harnesses do not tighten in response to pulling of a leash.

SUMMARY

In accordance with one embodiment, a restraining apparatus is provided for an animal having a head, a neck, a torso, a first pair of appendages, and a second pair of appendages. The animal wears a collar around the neck, and the restraining apparatus includes a ring having a longitudinal axis and defining an opening. A coupling element is adapted for fastening to the collar and is mounted to the ring. A substantially rigid arm with a proximal end is mounted to the ring and extends to a free distal end spaced from the ring, with the arm forming a substantially elongated opening with the ring.

In combination with the above embodiment, some embodiments are provided in which the arm extends away from the opening of the ring in substantially the same plane as the ring, and in other embodiments the arm extends away from the opening of the ring to be substantially nonplanar with the ring.

In any combination with any of the above embodiments, some embodiments are provided that further include a leash attached to the ring at an attached end and extending to a free end, with the leash having a length and a width perpendicular to the length.

In any combination with any of the above embodiments, some embodiments are provided in which the restraining apparatus may be configured as either a leash or a harness.

In any combination with any of the above embodiments, some embodiments are provided in which when the restraining apparatus is applied to the animal as a harness, the coupling element of the harness adapter is fastened to the collar, and the leash is wrapped around the torso of the animal between the first and second pairs of appendages, and the leash is received in the substantially elongated opening.

In any combination with any of the above embodiments, some embodiments are provided in which the leash may slide substantially freely in the substantially elongated opening, allowing the leash to tighten around the torso of the animal when the free end of the leash is pulled.

In any combination with any of the above embodiments, some embodiments are provided in which when the restraining apparatus is applied to the animal as a leash, the fastening means of the harness adapter is fastened to the collar, and the leash is not wrapped around the animal.

In any combination with any of the above embodiments, some embodiments are provided that further include an adjustment clip slidably mounted to the leash. In some such embodiments, when the restraining apparatus is applied to the animal as a harness, the adjustment clip is positioned between the ring and the attached end of the leash to prevent the leash from becoming too tight around the animal. In some other such embodiments, when the restraining apparatus is applied to the animal as a harness, the adjustment clip is positioned between the ring and the free end of the leash to prevent the leash from becoming too loose around the animal. In some embodiments, two adjustment clips may be used simultaneously to provide both functions; a first adjustment clip and a second adjustment clip are slidably mounted to the leash, and when the restraining apparatus is applied to the animal as a harness, the first adjustment clip is positioned between the ring and the attached end of the leash to prevent the leash from becoming too tight around the animal, and the second adjustment clip is positioned between the ring and the free end of the leash to prevent the leash from becoming too loose around the animal.

In any combination with any of the above embodiments, some embodiments are provided that further include cushioning material attached to the leash along a central portion of the leash spaced from the free end and the attached end.

In any combination with any of the above embodiments, some embodiments are provided in which the width of the leash along a central portion of the length of the leash is greater that the width of the leash proximate to the ends of the leash.

In any combination with any of the above embodiments, some embodiments are provided in which the substantially elongated opening is of substantially constant width.

In any combination with any of the above embodiments, some embodiments are provided in which the arm is attached to the ring at a position on the ring substantially opposite the side of the ring to which the coupling element is mounted.

In any combination with any of the above embodiments, some embodiments are provided in which the arm includes a bend proximate to the free distal end of the arm, the bend being transverse to the longitudinal axis of the ring. In some such embodiments, the bend defines an interior angle of less than 90 degrees.

In any combination with any of the above embodiments, some embodiments are provided in which the arm includes a segment proximate to the free distal end, the segment has a central axis, and the angle between the central axis of the segment and the longitudinal axis of the ring and that is opposite the central axis of the segment from the ring is approximately 90 degrees or less.

In any combination with any of the above embodiments, some embodiments are provided in which the arm includes a retention feature proximate to the free distal end of the arm. In some such embodiments, the retention feature is formed by a notch in the surface of the arm opposite the ring and proximate to the free distal end of the arm.

In accordance with another embodiment, a method of applying a restraining apparatus to an animal is provided. The animal has a head, a neck, a torso, a first pair of appendages, and a second pair of appendages, and wears a collar around the neck. The restraining apparatus includes a ring having a longitudinal axis and defining an opening, a coupling element adapted for fastening to the collar and being mounted to the ring, and a substantially rigid arm with a proximal end mounted to the ring and extending to a free distal end spaced from the ring. The arm forms a substantially elongated opening with the ring. A leash has a length, is attached to the ring at an attached end, and extends to a free end. The method includes releasably fastening the coupling element to the collar, and wrapping the leash around the torso of the animal between the first and second pairs of appendages. The leash is inserted substantially laterally into the substantially elongated opening, and slides freely in the substantially elongated opening, allowing the leash to tighten around the animal when the free end of the leash is pulled.

In some such embodiments, the restraining apparatus further includes an adjustment clip slidably mounted to the leash, and when the restraining apparatus is applied to the animal as a harness, the adjustment clip is positioned between the ring and the attached end of the leash to prevent the leash from becoming too tight around the animal. The method further includes sliding the adjustment clip along the length of the leash to a position to prevent the leash from becoming too tight around the animal. In other such embodiments, the restraining apparatus further includes an adjustment clip slidably mounted to the leash, and when the restraining apparatus is applied to the animal as a harness, the adjustment clip is positioned between the ring and the free end of the leash to prevent the leash from becoming too loose around the animal. The method further comprises sliding the adjustment clip along the length of the leash to a position to prevent the leash from becoming too loose around the animal.

BRIEF DESCRIPTION OF THE DRAWINGS

For a more complete understanding of embodiments of a convertible leash and harness for animals and associated methods, reference should now be had to the embodiments shown in the accompanying drawings and described below. In the drawings.

DETAILED DESCRIPTION

Figure 1:
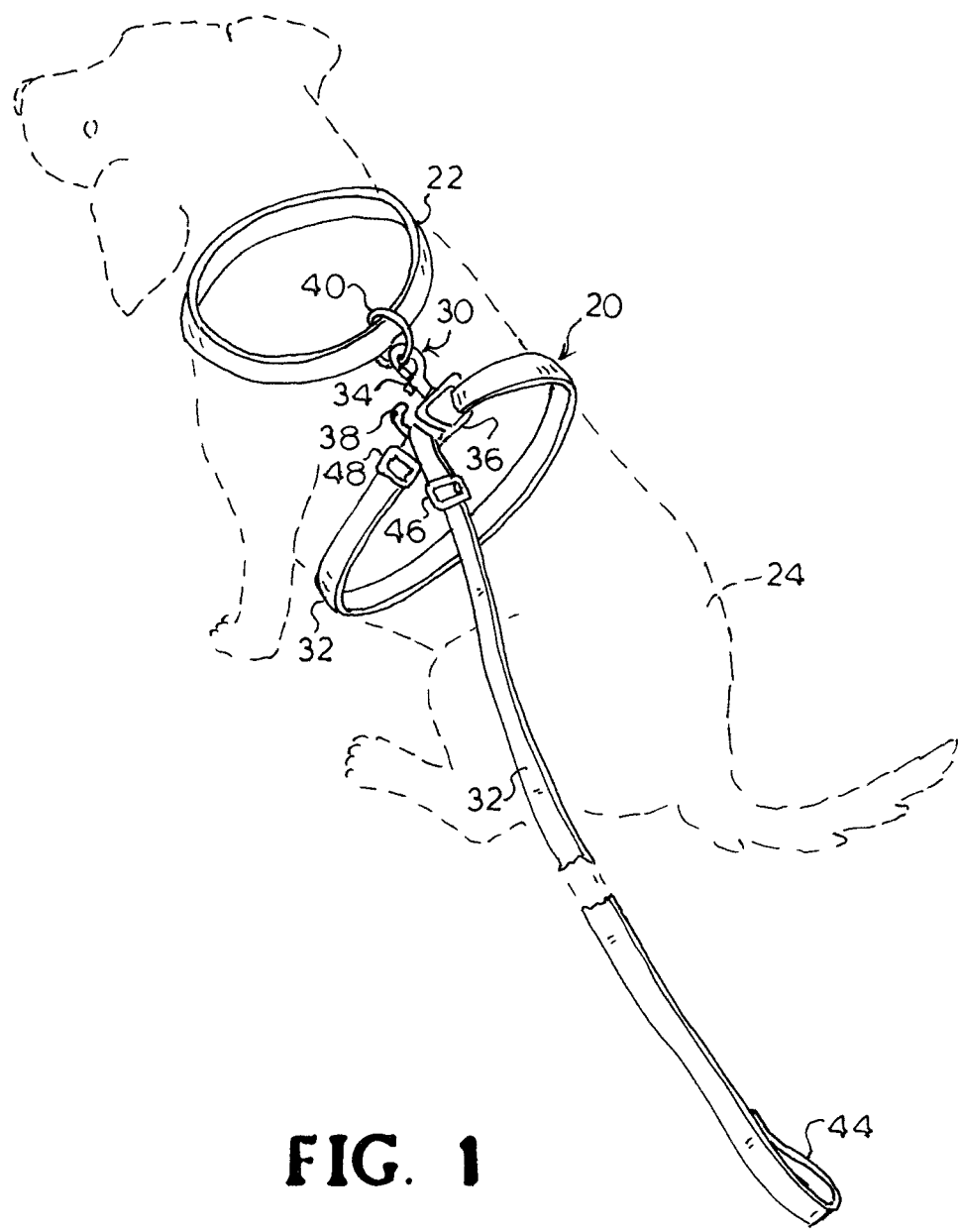
FIG. 1 is a rear perspective view of a first embodiment of a convertible leash and harness as secured to an exemplary animal as a harness.
Figure 2:
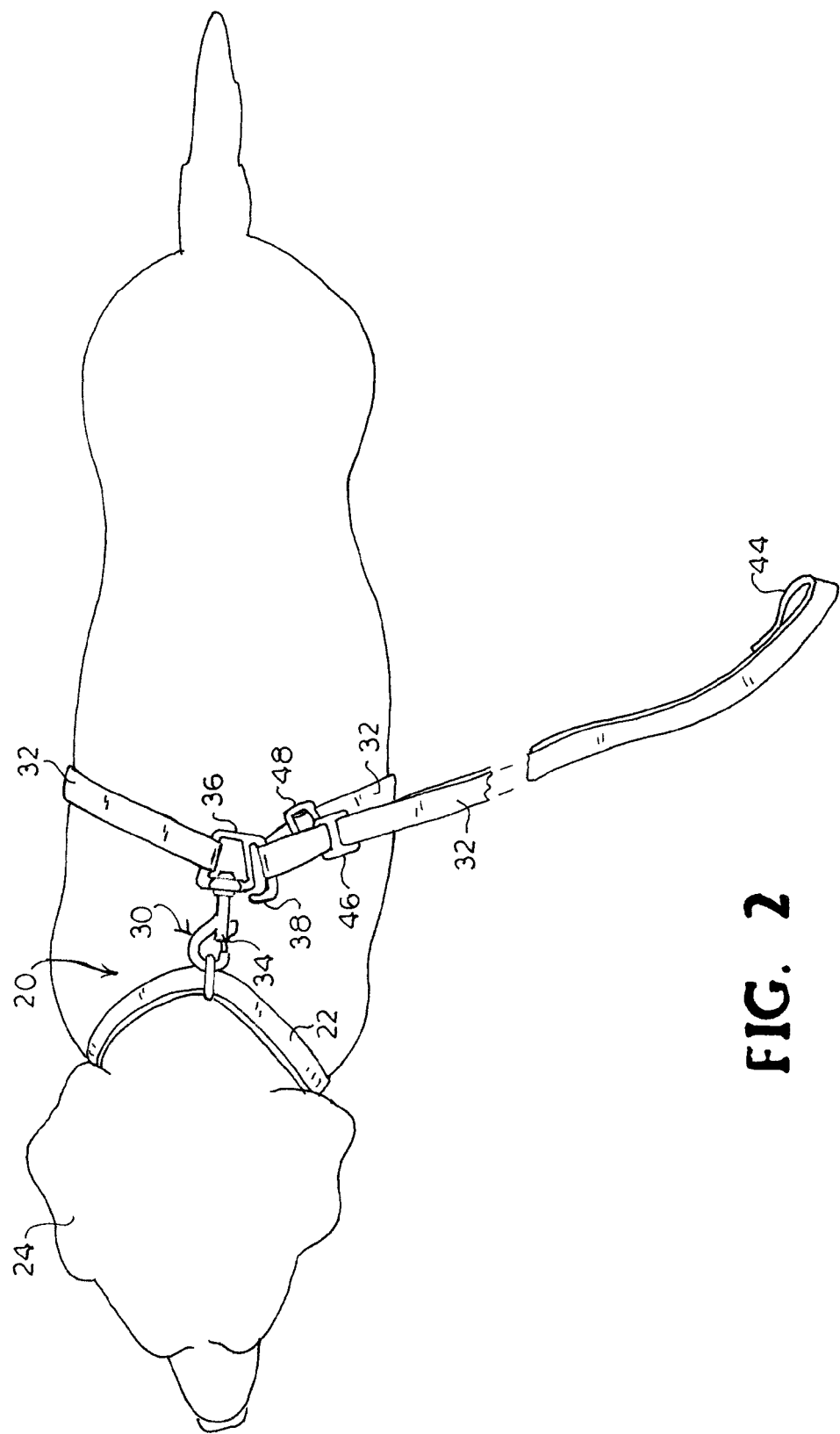
FIG. 2 is top plan view of the convertible leash and harness of FIG. 1 as secured to an exemplary animal as a harness.

Certain terminology is used herein for convenience only and is not to be taken as a limitation on the embodiments described. For example, words such as "top", "bottom", "front," "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the steps of the method may be performed in any order or simultaneously, unless it is clear from the context that one step depends on another being performed first.

Referring now to the drawings, wherein like reference numerals designate corresponding or similar elements throughout the several views, an embodiment of an animal restraining apparatus that is a convertible leash and harness 20 is shown in FIGS. 1-5 secured to an animal. Although in the figures herein the convertible leash and harness is shown secured to a dog, the convertible leash and harness 20 may be applied to nearly any type of animal with four legs, or two arms and two legs. For example, in addition to a dog, the convertible leash and harness 20 may be worn by a cat or a monkey. This embodiment of the convertible leash and harness 20 may be used in conjunction with a conventional collar 22 worn by the animal 24, and may include a harness adapter 30 and a leash 32.

The harness adapter 30 may include a coupling element 34, a ring 36, and an elongated arm member or arm 38 extending from the ring 36. The coupling element 34 of the harness adapter 30 may be releasably attached to the collar 22 by attachment to a ring 40 that is secured to the collar 22 to attach the harness adapter 30 to the collar 22. Alternatively, the coupling element 34 may be directly attached to the collar 22. The ring 40 of the collar 22 is often a D-ring, but could be circular or another shape. The leash 32 may be, in one embodiment, similar to a conventional leash that is attached to the ring 36 of the harness adapter 30. This attachment may be a permanent attachment, in which, for example, the end of the leash 32 has been passed through the ring 36 and is sewn, riveted, or otherwise attached to an adjacent part of the leash 32 to form a loop around the ring 36, as shown. Alternatively, the leash 32 could include a coupling element on the end of the leash 32 to releasably fasten the leash to the ring 36. The leash may be in the form of a strap, being substantially flat, or could have another cross-sectional shape, such rectangular. The leash 32 may be, for example, a woven or webbing material, and may be made of nylon, plastic, cotton, hemp, leather, or other material. At the end distal from the end that is attached to the ring 36 there may be conventionally a loop 44 through which a hand may be inserted. When configured as a harness, the leash 32 wraps around the animal 24 and engages the harness adapter 30, as discussed further below. Two adjustment clips 46, 48 may be provided that selectively may slide along the leash 32 or be in a fixed position along the leash 32, also as discussed further below.

Figure 3:
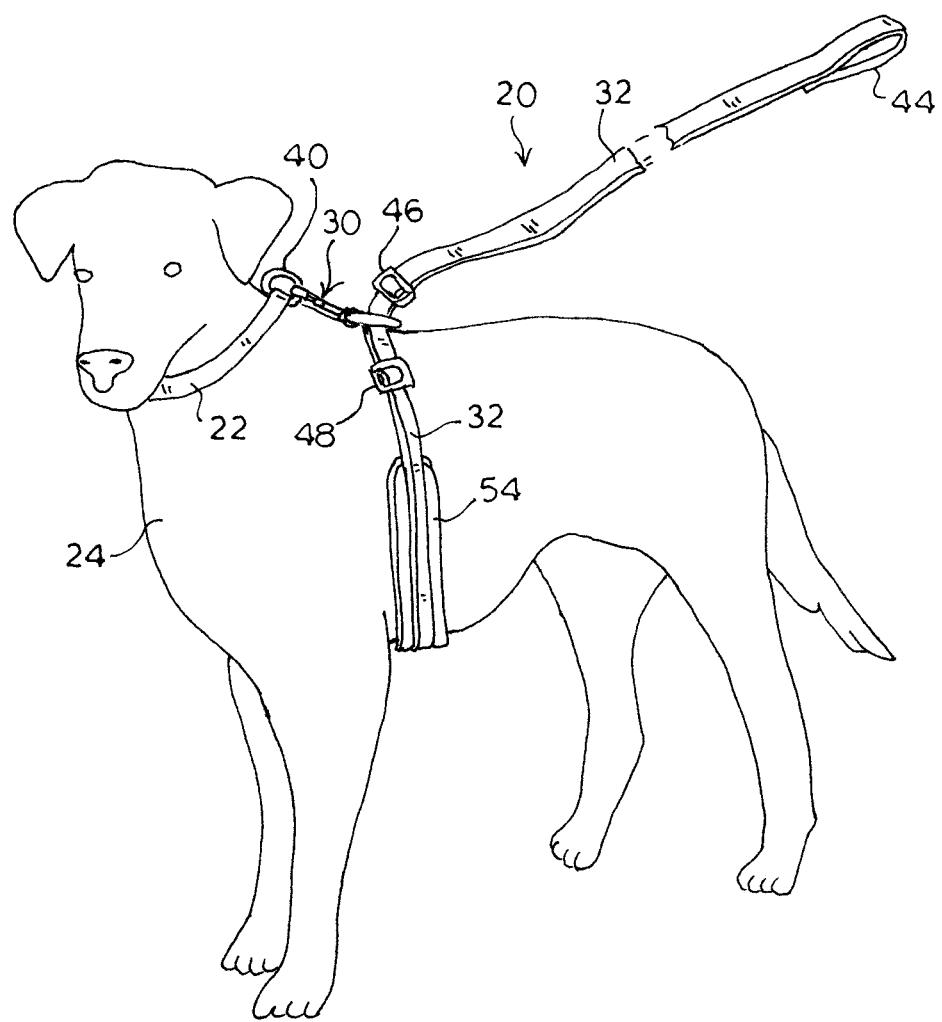
FIG. 3 is left side perspective view of the convertible leash and harness of FIG. 1 as secured to an exemplary animal as a harness.
Figure 4:
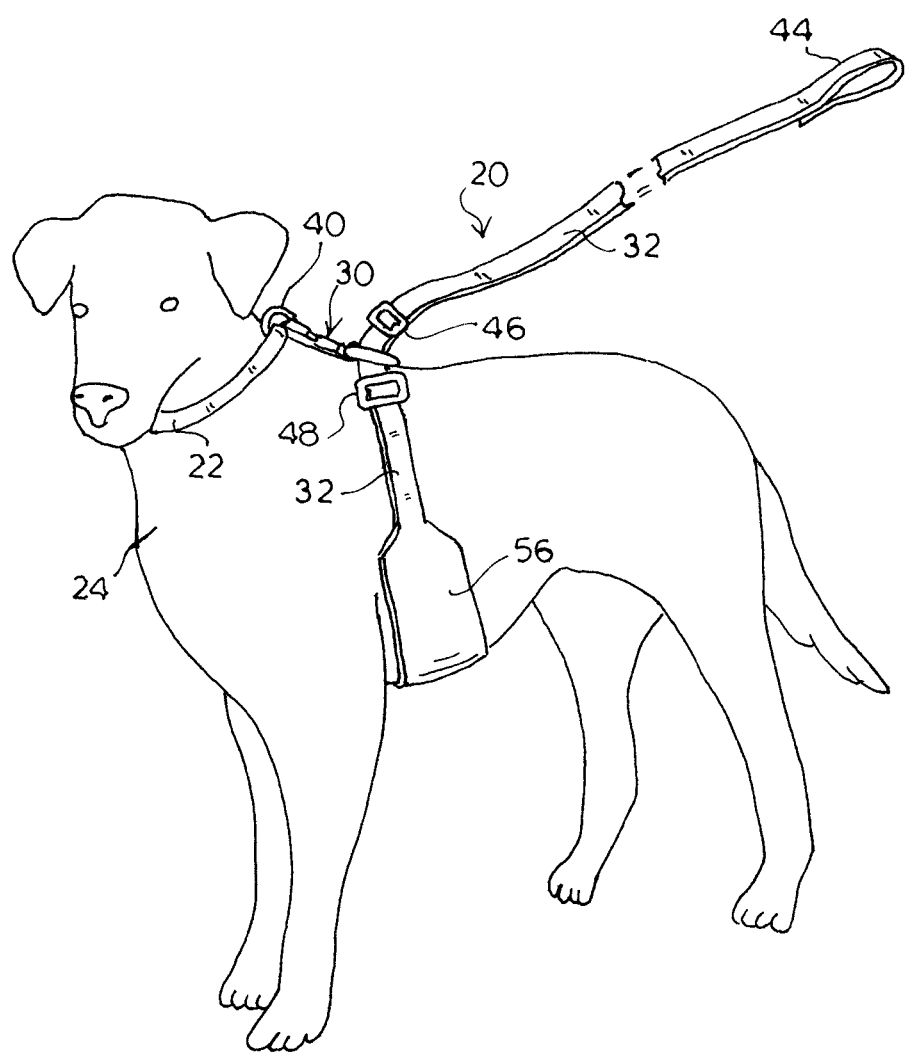
FIG. 4 is another left side perspective view of the convertible leash and harness of FIG. 1 as secured to an exemplary animal as a harness.

FIG. 3 shows the leash 32 to include cushioning 54 that may be attached to the leash 32 to be provided between the leash 32 and the animal 24 along the sides and underside or torso of the animal 24. The cushioning 54 may be, for example, foam, batting, or elastomeric material within a fabric shell, or other resilient material. FIG. 4 shows a leash 32 that may be a strap and that may include a section 56 with increased width along the sides and underside or torso of the animal 24. The increased width section 56 may serve to distribute force applied to the animal 24 over an area greater than would be provided if the leash 32 remained a constant, relatively narrow width. Both the cushioning 54 and the increased width section 56 may help to avoid excessive "digging in" of the material into the animal 24, if that would be considered undesirable, however, such features may be considered optional.

Figure 5:
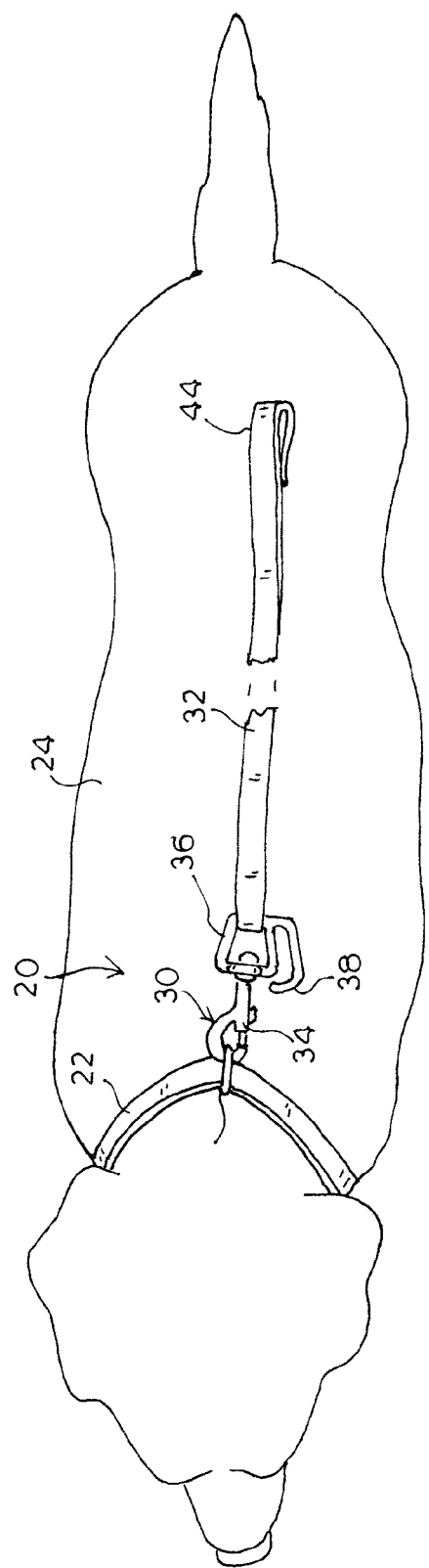
FIG. 5 is top plan view of the convertible leash and harness of FIG. 1 as secured to an exemplary animal as a leash.
Figure 6:
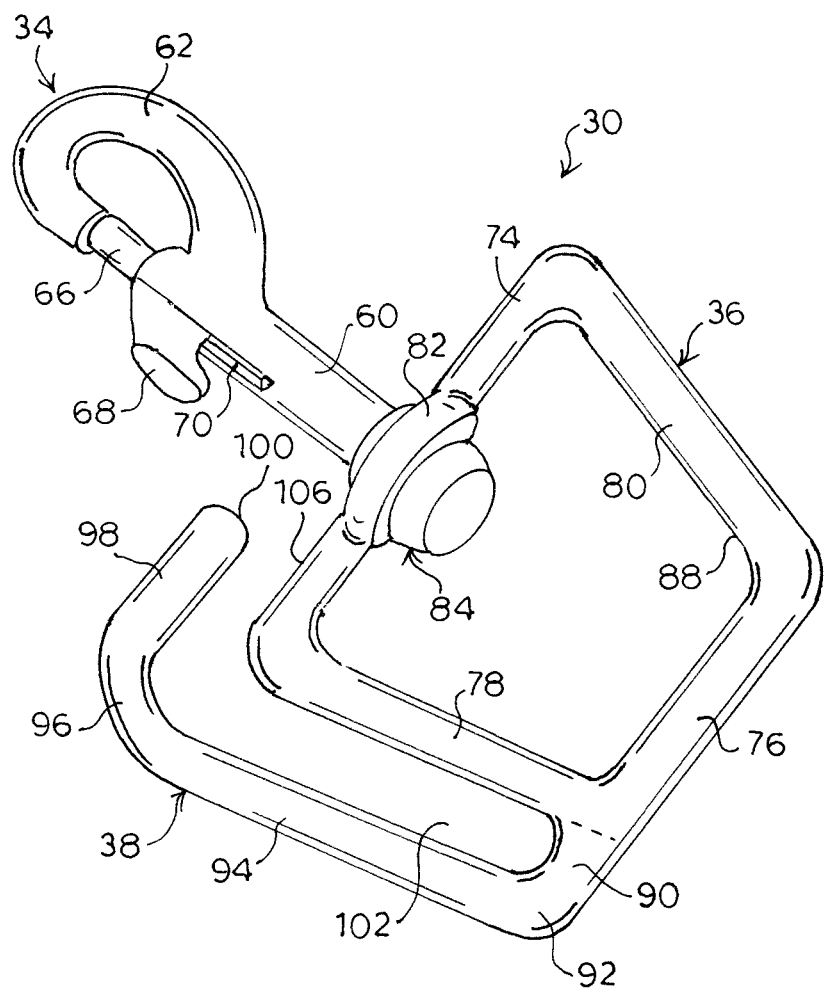
FIG. 6 is a perspective view of a harness adapter of the convertible leash and harness of FIG. 1.

FIG. 5 shows the convertible leash and harness 20 secured to the dog for use solely as a leash. As when the convertible leash and harness 20 is configured as a harness, the coupling element 34 of the harness adapter 30 is releasably attached to the ring 40 of the collar 22, but the leash 32 is not wrapped around the animal 24.

FIGS. 6-11 show various views of the harness adapter 30. The coupling element 34 is shown as a bolt snap, but could be any structure that serves to securely and releasably fasten the harness adapter 30 to the ring 40 of the animal's collar 22. Examples of other coupling elements that could be used include spring hooks, slide bolt snap hooks, spring wire gate bolt snap hooks, lobster claw gate bolt snap hooks, trigger snaps, and push gate snap hooks. The bolt snap shown includes a shank 60 that at one end is mounted to the ring 36 of the harness adapter 30, a hook 62 extending from the opposite end of the shank 60 and forming an opening 64, and a latch 66 with a protrusion 68 extending therefrom. The latch 66 is retractable into an opening in the shank 60 when the protrusion 68 is depressed, and the protrusion 68 slides in a slot 70 in the shank 60. The latch is spring-biased and closes when the protrusion 68 is released.

The shank 60 of the coupling element 34 may be in a fixed position relative to the ring 36, or alternatively may be swivel-mounted as in the embodiment shown, allowing the coupling element 34 to rotate about the axis of the shank 60. The ring 36 in the embodiment shown is a symmetrical trapezoid, with the base or front side 74 being the longest side, and the shape being symmetrical about the longitudinal axis X-X of the ring 36. Parallel to the front side 74 is the rear side 76. Left side 78 and right side 80 taper from the front side 74 to the rear side 76. An end of the shank 60 passes through an opening in an enlarged central portion 82 of the front side 74 and is secured with the swivel mounting 84. The shape of the ring 36 could be a variety of shapes other than a trapezoid, for example, D-ring, rectangular, circular, rounded, hexagonal, and so forth; the shape of the ring 36 is not intended to be limited to that shown.

The arm 38 may extend from the left end of the rear side 76 of the ring 36, may be substantially rigid, and may be in a fixed position relative to the ring 36. The arm 38 may be in substantially the same plane as the ring 36 as shown, or may be non-planar relative to the ring 36. In the embodiment shown, the arm may have three segments: a first segment 90 that may be attached to the lower left corner of the ring 36 and may be an extension of the rear side 76, then a first bend 92 frontward to a second segment 94 that may be substantially parallel to the left side 78, then a return bend 96 toward the longitudinal axis X-X with a third segment 98 that may be substantially parallel to the front side 74 and have a free distal end 100. The second segment 94 and the left side 78 of the ring 36 form a substantially elongated opening or slot 102, which may be of substantially constant width as shown, or may vary in width. The third segment 98 and the front side 74 form an opening 106 that serves as an entrance to the slot 102 for the leash 32.

Figure 7:
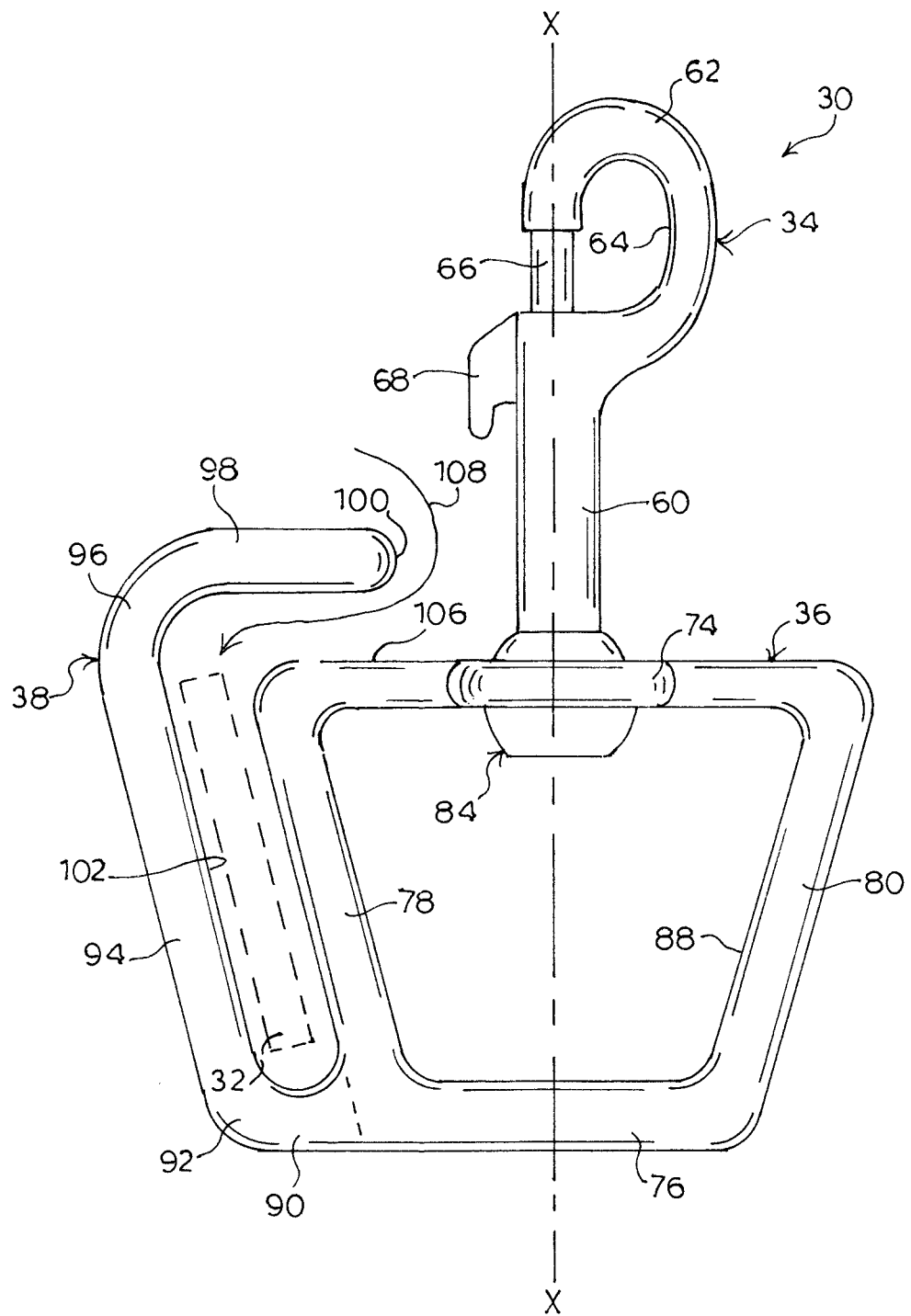
FIG. 7 is top plan view of the harness adapter of FIG. 5, with the bottom plan view being a mirror image thereof.
Figure 8:
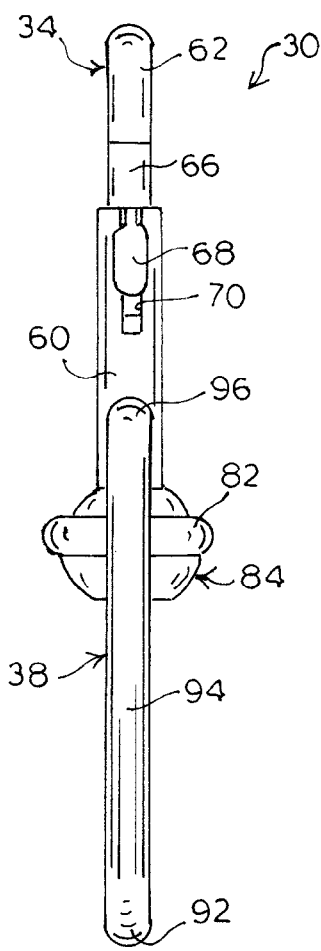
FIG. 8 is a left side elevation view of the harness adapter of FIG. 5.
Figure 9:
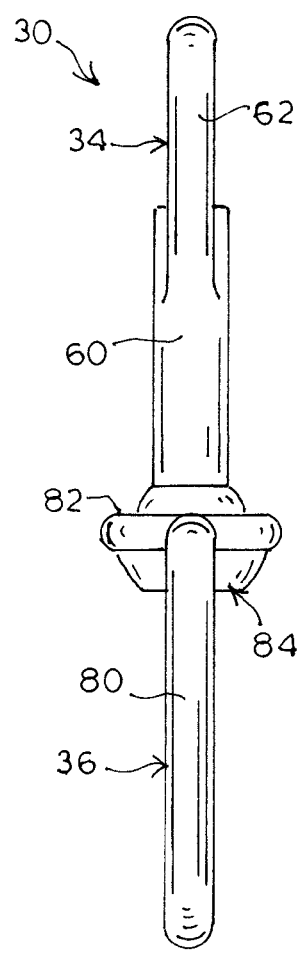
FIG. 9 is a right side elevation view of the harness adapter of FIG. 5.
Figure 10:
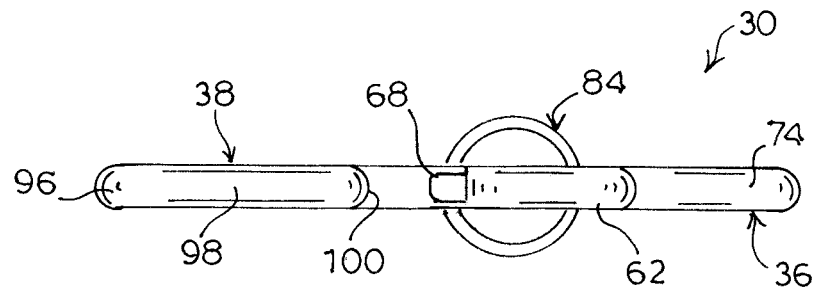
FIG. 10 is a front elevation view of the harness adapter of FIG. 5.
Figure 11:
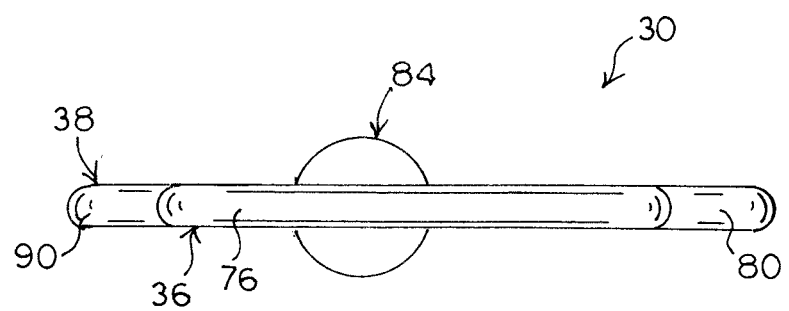
FIG. 11 is a rear elevation view of the harness adapter of FIG. 5.

As shown in FIG. 7, the leash 32 enters the opening 106 laterally, i.e. substantially perpendicular to the length of the leash 32, and bends around its length to follow a winding path 108 to reach the desired position in the slot 102. The leash 32 may be positioned without threading the leash 32 through any components, and without any moving parts being involved. The angle of the return bend 96 tends to retain the leash in the slot 102, and the angle of the first bend 92 tends to orient the arm 38 such that the leash 32 somewhat evenly distributes the force applied across the left side 78 when the leash is on the animal. The free distal end 100 of the arm 38, the interior radius formed by the left side 78 of the ring 36 and the first segment of the 90 of the arm 38, and the interior radii of the bends 92, 96 of the arm 38 may be rounded and smooth to prevent the leash from catching on the harness adapter 30. The shape of the arm 38 may vary, and may need to be varied, depending on the shape of the ring 36.

Figure 12:
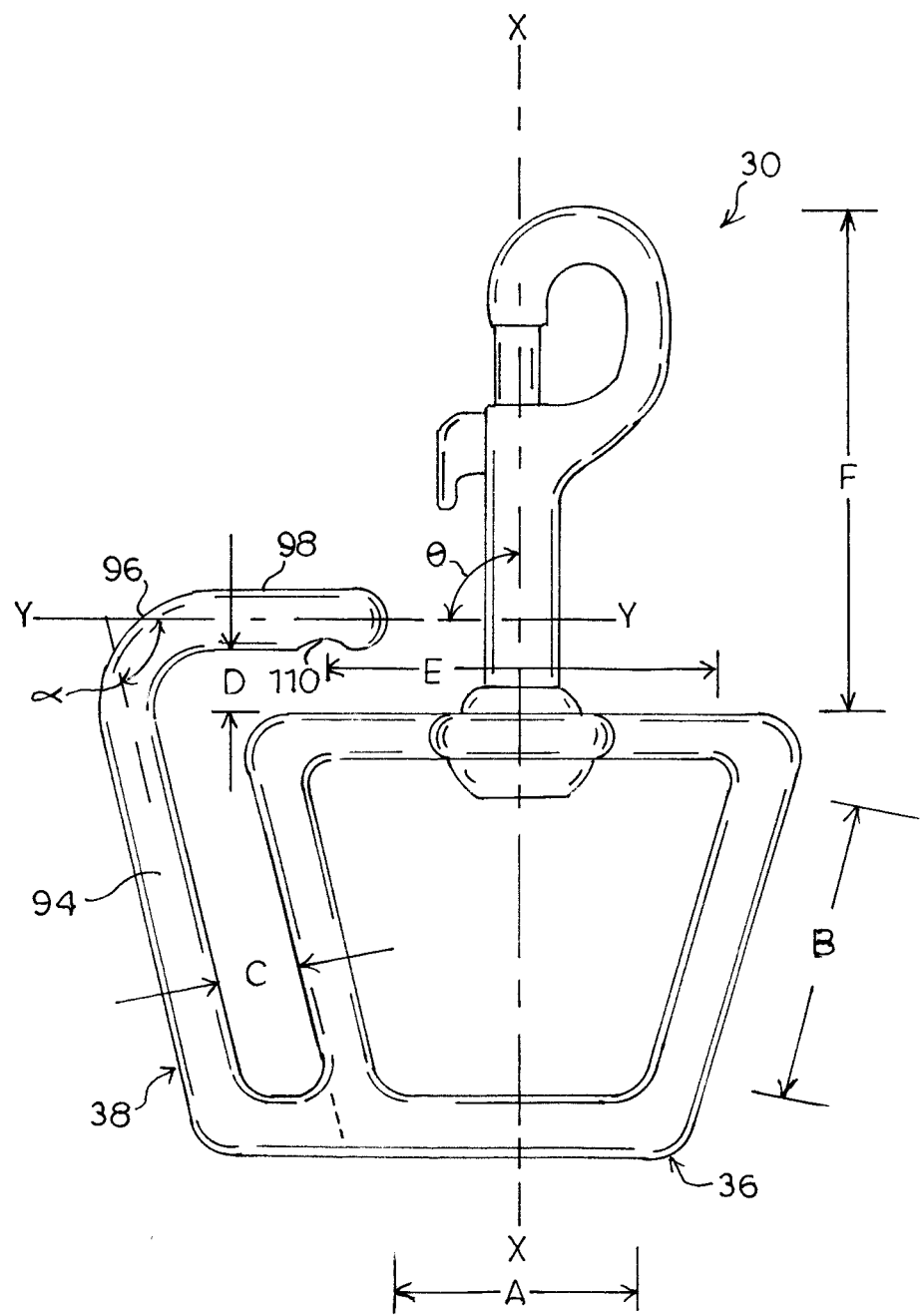
FIG. 12 is an annotated front elevation view of the harness adapter of FIG. 5.

In FIG. 12, a notch 110 has been added to the interior of the arm 38 proximate to the free distal end 100 of the embodiment of a harness adapter 30 that is shown. The notch 110 may provide an additional restraining feature to prevent unintentional withdrawal of the leash 32 from the slot 102 and opening 106. The notch 110 may be shaped to cause the leash 32 to catch on the distal side of the notch 110 when the leash 32 is being pulled away from the harness adapter 30 (or when the harness adapter 30 is being pulled away from the leash 32). Alternatively, a hook could be added to the free distal end 100 of the arm 38.

FIG. 12 also highlights various dimensions and angles for the shown embodiment of a harness adapter 30. The angle α at return bend 96 may preferably be less than 90 degrees, is shown at approximately 76 degrees, and may be, for example, between 70 and 85 degrees, but will vary depending on the angle that the second segment 94 is relative to the longitudinal axis X-X. The angle θ, which is the angle between the axis Y-Y of the third segment 98 and the longitudinal axis X-X is shown at approximately 90 degrees, and may preferably be 90 degrees or less to help retain the leash 32 in the slot 102. Dimensions for two example embodiments are as follows. For an example of a relatively small harness adapter dimensions may be approximately, for a ⅝" wide woven leash: A=0.55", B=0.625", C=0.1875", D=0.1875", E=0.86", F=1.5". For an example of a relatively large harness adapter dimensions may be approximately, for a 1" wide woven leash: A=0.9", B=1.0", C=0.1875", D=0.1875", E=1.4", F=2.0". One possible dimension could be that the width (C) of the slot 102 may be equal to the thickness of the leash 32 plus ⅛". The angles and dimensions discussed, however, may vary in different embodiments from those discussed herein.

The materials of the harness adapter 30 maybe as suitable for the forces encountered in use; conventionally the material is steel for coupling elements such as bolt snaps as well as rings. One example of a material for the ring 36 and the arm 38 is round stock steel, ³⁄₁₆" diameter, which is cast, welded, or a combination of both. However, the ring 36 and the arm 38 could be other materials, cross-sectional shapes, or dimensions.

The convertible leash and harness 20 may be applied to an animal in one exemplary manner as follows, noting that designations of left and right and the direction of putting on the convertible leash and harness 20 may be reversed by turning the harness adapter 30 the other direction than that shown to place the arm 38 on the right side rather than the left. The animal is wearing a collar that may be relatively snug but not constrict the animal's neck. First, the harness adapter 30 is attached to the ring 40 of the collar, and is placed on the back of the animal to lie flat in a position that may be between the shoulder blades of the animal, in a position that may look like that shown in FIG. 5. Next, the leash 32 is wrapped down the animal's right side, under the animal's chest/torso behind the animal's front legs, and up the animal's left side. Then the leash 32 is placed alongside the opening 106 formed by the arm 38 and the ring 36 and is inserted laterally into the opening 106. The leash 32 may need to bend along its length in order to reach the substantially elongated opening or slot 102. Once in the slot 102, the leash 32 is relatively free to slide in either direction along the length of the leash 32 in the slot 102, and may be pulled up to be snug on the animal.

If there is no force applied to the leash 32, either by the animal pulling or the handler pulling on the leash 32, the leash may loosen, and if force is applied, the leash 32 will tighten around the animal 24. Accordingly, if provided, one adjustment clip 46 may be adjusted to prevent the leash 32 from extending to far through the harness adapter 30 and becoming too loose, and the other adjustment clip 48 may be adjusted to prevent the leash 32 from becoming too tight on the animal 24. The clips 46, 48 may be sized such that they cannot fit through the opening formed by the arm 38 and the ring 36, so that when a clip 46, 48 abuts the harness adapter 30 the leash can no longer continue in the same direction. While shown as having three bars that extend across the leash 32, the clips 46, 48 may be any structure that may selectively slide along the leash 32 or grip the leash 32 and not slide.

Embodiments disclosed herein may provide a convertible leash and harness system including a ring and arm that may engage a leash with no moving parts. The leash may be laterally urged into a slot in a harness adapter without the need to thread the leash through a ring or other component, or the use of components with moving parts. The leash may tighten or loosen on the animal depending on whether there is force on the leash or the leash is relaxed, and such relatively free movement of the leash through the slot in the harness adapter may aid in controlling, restraining, or training the animal.

Although the embodiments described above have been shown and described in considerable detail with respect to only a few exemplary embodiments thereof, it should be understood by those skilled in the art that it is not intended to be limited to these embodiments since various modifications, omissions and additions may be made to the disclosed embodiments without materially departing from the novel teachings and advantages. For example, the leash may be permanently attached to the ring of harness adapter, or the harness adapter and the leash could be provided separately, with the leash being releasably fastened to the ring. As previously noted, the shape of the ring of the harness adapter may be different than described above, and accordingly the shape of the arm may have to be different in order to function with a different shape ring. Accordingly, it is intended to cover all such modifications, omission, additions and equivalents as may be included within the scope of the convertible leash and harness system and associated methods as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method of restraining an animal having a head, a neck, a torso, a first pair of appendages, and a second pair of appendages, the animal wearing a collar around the neck, the method comprising:

providing a restraining apparatus comprising a closed, substantially rigid ring defining an opening, the ring having an inner surface proximate to the opening and an outer surface opposite the inner surface, a coupling element including a fasten and release feature adapted for fastening to the collar, the coupling element is movably mounted directly to the ring, and a substantially rigid arm with a proximal end rigidly mounted to the ring, the arm having an inner surface proximate to the ring, wherein the arm is maintained in a fixed position relative to the ring, the arm comprising a first portion having a longitudinal axis, the first portion of the arm extending from the proximal end of the arm spaced from the ring and outside limits of the opening defined by the ring to a distal end of the first portion of the arm, the first portion of the arm having an inner surface opposing the outer surface of the ring and forming a substantially elongated first opening with the outer surface of the ring, the first opening having a length extending from a proximal end of the first opening where the arm is mounted to the ring to a distal end of the first opening at a bend in the ring, said bend extends in a direction away from the first portion of the arm, the first portion of the arm having a length greater than the length of the elongated first opening, and a second portion extending from the distal end of the first portion of the arm transversely to the longitudinal axis of the first portion of the arm in a direction toward the ring to a free distal end such that an inner surface of the second portion of the arm and the opposed outer surface of the ring form an elongated second opening transverse to and contiguous with the length of the first opening, the second portion of the arm having a length greater than the distance between the inside surface of the first portion of the arm and the opposed outer surface of the ring;

releasably fastening the coupling element to the collar;

attaching a leash to the ring at an attached end of the leash;

wrapping the leash around the torso of the animal between the first and second pairs of appendages; and disposing the leash substantially laterally into the substantially elongated first opening, wherein the leash slides freely in the substantially elongated first opening, allowing the leash to tighten around the animal when a free end of the leash is pulled.

2. The method of claim 1, wherein the restraining apparatus further comprises an adjustment clip slidably mounted to the leash, and when the restraining apparatus is applied to the animal as a harness, the adjustment clip is positioned between the ring and the attached end of the leash to prevent the leash from becoming too tight around the animal, and the method further comprises sliding the adjustment clip along a length of the leash to a position to prevent the leash from becoming too tight around the animal.

3. The method of claim 1, wherein the restraining apparatus further comprises an adjustment clip slidably mounted to the leash, and when the restraining apparatus is applied to the animal as a harness, the adjustment clip is positioned between the ring and the free end of the leash to prevent the leash from becoming too loose around the animal, and the method further comprises sliding the adjustment clip along a length of the leash to a position to prevent the leash from becoming too loose around the animal.

* * * * *